Sept. 25, 1934.   M. HELFENSTEIN   1,974,492
PHOTOMETER FOR DETERMINING THE TIME OF EXPOSURE
FOR PHOTOGRAPHIC PICTURE TAKING
Filed Aug. 24, 1933
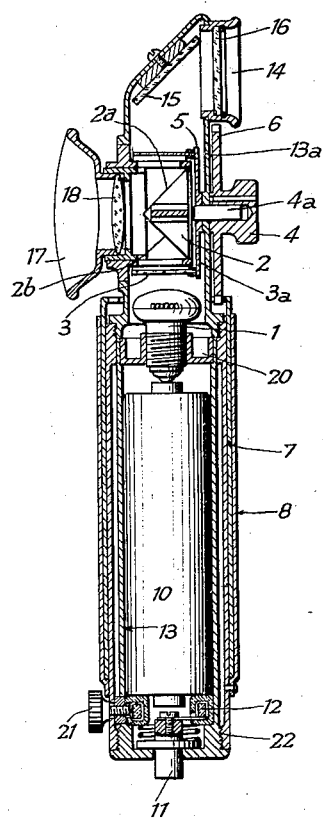
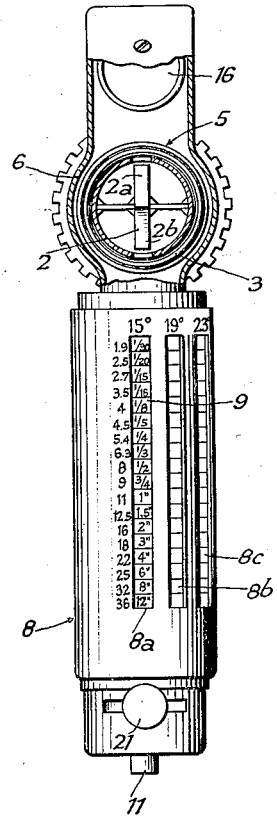
Inventor:
Max Helfenstein,
By Sommers + Young
Attys.

Patented Sept. 25, 1934

1,974,492

UNITED STATES PATENT OFFICE 1,974,492

PHOTOMETER FOR DETERMINING THE TIME OF EXPOSURE FOR PHOTOGRAPHIC PICTURE TAKING

Max Helfenstein, Lucerne, Switzerland

Application August 24, 1933, Serial No. 686,603
In Germany August 30, 1932

3 Claims. (Cl. 88—23)

This invention is a method of determining exposures for photography based upon the principle of comparing the source of light to be measured with another source of light of known intensity; and is particularly concerned with instruments in which the comparison is effected by a photometer of the Ritchie type. In the Ritchie photometer the incident light to be measured and an artificial source of light of constant intensity each illuminate one of two mutually inclined adjacent surfaces, the edge at which the surfaces meet disappearing when the surfaces are equally brightly illuminated. As, however, the light intensities to be measured for photographic purposes vary within wide limits, there is considerable difficulty in applying the principle, especially as the source of light to be examined can neither be brought nearer to the inclined surface nor moved away from it. It is possible to effect the measurement by placing a diaphragm beside each of the inclined surfaces; but this would also necessitate the use of dispersing lenses between each inclined surface and its diaphragm to obtain uniform distribution of the light over the surface for all apertures of the diaphragms.

According to the present invention these difficulties are obviated in the photometer by placing about the mutually inclined surfaces a semi-cylindric or cylindric light filter which is arranged to be rotatably displaced from outside, so as to be adapted to be moved opposite one or other of the inclined surfaces, for the purpose of obtaining equalization of brightness.

Advantageously, the light filter is adapted for absorbing to any desired extent the light by which one or other of the inclined surfaces is seen. The filter or filters should also ensure that light of the same color is at all times transmitted to the eye, so that each setting of the instrument may definitely correspond to a particular intensity of the source to be measured.

Preferably, the secondary source of light used for comparison is an electric incandescent lamp.

In the accompanying drawing a constructional form of the photometer for carrying out the invention is illustrated by way of example only, in which Fig. 1 is a longitudinal section of the photometer;

Fig. 2 is an elevation of Fig. 1.

In the example illustrated in Figs. 1 and 2 a wedge 2 formed by mutually inclined surfaces $2a$ and $2b$ is mounted in the narrowed upper part $13a$ of a tube 13 with the edge at which the two surfaces meet opposite an eyepiece 17, 18. Opposite the eyepiece and aligned with its optical axis a pivot pin $4a$ is mounted in the tube 13, its outer end carrying a button 4, and its inner end a disc $3a$ which carries a cylindrical light filter 3 encircles the wedge 2. The filter is of graduated translucence and can be turned by means of the button 4 through any desired angle to interpose in the path of the light falling on one or other surface $2a$, $2b$ the requisite opacity. At the upper end of the tube 13 is an aperture 14 for the incident light and in it is a color filter 16. Beside the aperture 14 and inclined at an angle of 45° to its axis is a mirror 15 which reflects the incident light towards the wedge 2.

In the lower portion of the tube 13 is accommodated a cylindrical electric battery 10 similar to that of a pocket lamp above which, in usual manner is fitted a holder 20 for a small incandescent lamp 1. In the lower end of the tube 13 there is a spring-pressed push-button 11 for switching on the lamp 1. Furthermore, underneath the battery there is a rheostat 12 adjusted by means of a regulating slide 21 movable around it. Around the tube 13 is fastened a sleeve 22 to which is attached an outer casing 8. Between the sleeve 22 and the casing 8 a drum 7 is rotatably accommodated the upper end of which is formed with gear teeth which mesh with a spur gear wheel 6 secured to the button 4. The casing 8 is provided with a number of longitudinal slots $8a$, $8b$, $8c$, each slot corresponding to a certain plate or film speed. On the drum 7 vertical columns are provided each containing a series of figures indicating the times of exposure for the several apertures marked on the casing 8 alongside the slots.

When it is desired to determine by means of the photometer the time of exposure necessary for taking a picture, the eyepiece 17, 18 is brought to the eye and the aperture 14 is directed towards the object to be photographed. Then the lamp 1 is switched on and the button 4 turned until both sides $2a$ and $2b$ of the wedge present the same brightness, i. e. until the edge between them disappears. Then the time of exposure for any given aperture can be read off through the longitudinal slot of the casing 8 corresponding to the speed of the negative. The color filter 16 at the aperture 14 makes the incident light (assuming it to be daylight) transmitted to the surface $2a$ similar in color to the light of the lamp used for comparison, since otherwise the two inclined surfaces cannot be adjusted to equal brightness.

For photography by artificial light the colour filter may be removed. Instead of being cylindrical, the light filter may be provided with cylindric portions only on a part of its circumference.

I do not limit myself to the particular size, shape, number or arrangement of parts as shown and described, all of which may be varied without going beyond the scope of my invention as shown, described and claimed.

What I claim is:

1. A photometer for measuring light intensity in photography, a casing, a pair of surfaces angularly disposed relative to each other, a source of light of constant intensity in said casing and shining toward one of said surfaces, the casing being provided with an opening to permit outside light to shine on the other of said surfaces, said casing also being provided with an opening for observing the pair of surfaces, a continuous circularly curved light filter encompassing the pair of surfaces, said filter having graduated translucence, and means for rotating the filter to bring different parts thereof in the paths of the light rays of both the constant source and the outside.

2. A photometer for measuring exposures for photography, a tubular body, an aperture provided in the upper part of said body for the incident light to be measured, a sleeve connected to the lower part of said body to surround the same, an outer casing for said sleeve provided with longitudinal slots and several apertures marked alongside the slots, an upwardly toothed drum rotatably mounted between said sleeve and said casing and provided with columns each containing a series of figures indicating the times of exposures for said apertures, a comparison source of light of known constant intensity accommodated inside said body, a pair of mutually inclined surfaces inserted in the paths both of the rays of said incident light and said comparison source of light, a rotatable light filter having cylindric surface portions arranged to encircle said inclined surfaces, means for rotationally displacing said light filter opposite one or other of said inclined surfaces, for obtaining equality of illumination of said inclined surfaces, and a gear wheel of said actuating means cooperating with said gear teeth of said drum for turning the latter in registry of its slots with said columns to permit reading off the respective time of exposure.

3. A photometer for measuring exposures for photography, a tubular body, an aperture provided in the upper part of said body for the incident light to be measured, a sleeve connected to the lower part of said body to surround the same, an outer casing for said sleeve provided with longitudinal slots and several apertures marked alongside the slots, an upwardly toothed drum rotatably mounted between said sleeve and said casing and provided with columns each containing a series of figures indicating the times of exposures for said apertures, a comparison source of light of known constant intensity accommodated inside said body, a pair of mutually inclined surfaces inserted in the paths both of the rays of said incident light and said comparison source of light, a rotatable light filter having cylindric surface portions arranged to encircle said inclined surfaces, a pivot pin for rotationally displacing said light filter opposite one or other of said inclined surfaces, for obtaining equality of illumination of said inclined surfaces, a finger piece for operating said pivot pin from outside, and a disc carried by said pivot pin together with said drum and receiving said light filter.

MAX HELFENSTEIN.